United States Patent
Luttge et al.

(10) Patent No.: US 7,324,215 B2
(45) Date of Patent: Jan. 29, 2008

(54) NON-DESTRUCTIVE OPTICAL IMAGING SYSTEM FOR ENHANCED LATERAL RESOLUTION

(75) Inventors: Andreas Luttge, Katy, TX (US); Dale S. Sawyer, Houston, TX (US); Pamela G. Conrad, Alta Loma, TX (US)

(73) Assignee: William Marsh Rice University, Houston, TX (US)

( * ) Notice: Subject to any disclaimer, the term of this patent is extended or adjusted under 35 U.S.C. 154(b) by 160 days.

(21) Appl. No.: 10/528,720

(22) PCT Filed: Sep. 23, 2003

(86) PCT No.: PCT/US03/29946

§ 371 (c)(1),
(2), (4) Date: Jan. 17, 2006

(87) PCT Pub. No.: WO2004/027686

PCT Pub. Date: Apr. 1, 2004

(65) Prior Publication Data

US 2006/0158660 A1 Jul. 20, 2006

Related U.S. Application Data

(60) Provisional application No. 60/412,827, filed on Sep. 23, 2002.

(51) Int. Cl.
*G01B 11/02* (2006.01)

(52) U.S. Cl. .................................................... 356/512

(58) Field of Classification Search ................ 356/500, 356/501, 511, 512, 516
See application file for complete search history.

(56) References Cited

U.S. PATENT DOCUMENTS

| | | | |
|---|---|---|---|
| 5,208,451 A | 5/1993 | Deck | |
| 5,914,782 A | 6/1999 | Sugiyama | |
| 6,028,670 A | 2/2000 | Deck | |
| 6,493,093 B2 | 12/2002 | Harasaki et al. | |
| 6,771,350 B2 * | 8/2004 | Nishinaga | 355/53 |

* cited by examiner

*Primary Examiner*—Michael A. Lyons
(74) *Attorney, Agent, or Firm*—Conley Rose, P.C.; Rodney B. Carroll

(57) ABSTRACT

In some embodiments, an optical imaging system comprises a non-destructive optical device that obtains information concerning a target object and a X,Y positioning system that is capable of positioning one or both of the target object and the optical device to pre-determined offset locations more closely spaced than the obtainable resolution of the optical device. A first "base" image is produced and then overlapping additional images may be produced by the positioning one or both of the target object and the optical device to the pre-determined locations. The first image and the additional images may be combined to produce a single combined image that contains inherently more information than the first image or any of the additional images alone. The combined image then may be digitally restored and enhanced to produce an image with a greater resolution than the optical device yields.

18 Claims, 1 Drawing Sheet

NON-DESTRUCTIVE OPTICAL IMAGING SYSTEM FOR ENHANCED LATERAL RESOLUTION

CROSS-REFERENCE TO RELATED APPLICATIONS

This application claims priority to U.S. Provisional Application Ser. No. 60/412,827 titled "High-Resolution Vertical Scanning Interferometry," filed Jul. 31, 2002, and incorporated herein by reference.

BACKGROUND OF THE INVENTION

1. Technical Field of the Invention

The present invention relates generally to optical devices and more particularly to optimizations of optical devices.

2. Background Information

Optical devices, such as cameras and microscopes, use electromagnetic radiation to obtain information describing a target object. For example, a microscope may use electromagnetic radiation in the form of visible light to obtain an image of microscopic bacteria. The information obtained from an optical device describing a target object has an associated characteristic, referred to as resolution. The resolution defines the capacity of the optical device to resolve closely spaced features of the target object. The resolution of an optical device may depend upon a number of factors, including the inherent physical characteristics of the device and the wavelength of electromagnetic radiation used by the device.

An optical device may be used to produce an image of the target object. The image may comprise elements referred to as "pixels." Each pixel is associated with a single value that represents a measured property on the surface of the target object. The measured property may include brightness, temperature, height, reflectivity, or any other meaningful characteristic of a surface. Typically, each pixel is associated with a specific surface area of the target object. The area is often referred to as the "footprint" of the pixel. The value associated with a particular pixel may represent the average of the measured property over the footprint of the pixel.

An array of pixels forms an image. The array of pixels is most often in a square or rectangular pattern, but other patterns (e.g., circular) may also be used. The imaged area of the target object is determined by the spacing and number of pixels in each of two, usually orthogonal, directions. The pixel spacing in a direction is the distance on the surface of the target object between the center points of two adjacent pixel footprints. The spacing may be different in the two, usually orthogonal, directions. The image length along one direction is given by the pixel spacing in that direction multiplied by the number of pixels in that direction.

Lateral resolution is a measure of how close two features on the surface of a target object may reside and still be distinguished in an image as two distinct features. Pixel spacing is often used as a rough indicator of the lateral resolution. Typically, two features must be separated by at least two times the pixel spacing. In some imaging systems, there may be additional constraints on the lateral resolution due to the overlapping of adjacent pixel footprints. When the additional constraints exist, the lateral resolution may be poorer than two times the pixel spacing.

BRIEF SUMMARY

In some embodiments, an optical imaging system comprises a non-destructive optical device that obtains information concerning a target object and a X,Y positioning system that is capable of positioning one or both of the target object and the optical device to pre-determined offset locations more closely spaced than the obtainable resolution of the optical device. A first "base" image is produced and then overlapping additional images may be produced by the positioning one or both of the target object and the optical device to the pre-determined locations. The first, image and the additional images may be combined to produce a single combined image that contains inherently more information than the first image or any of the additional images alone. The combined image then may be digitally restored and enhanced to produce an image with a greater resolution than the optical device yields.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

Figure 1:
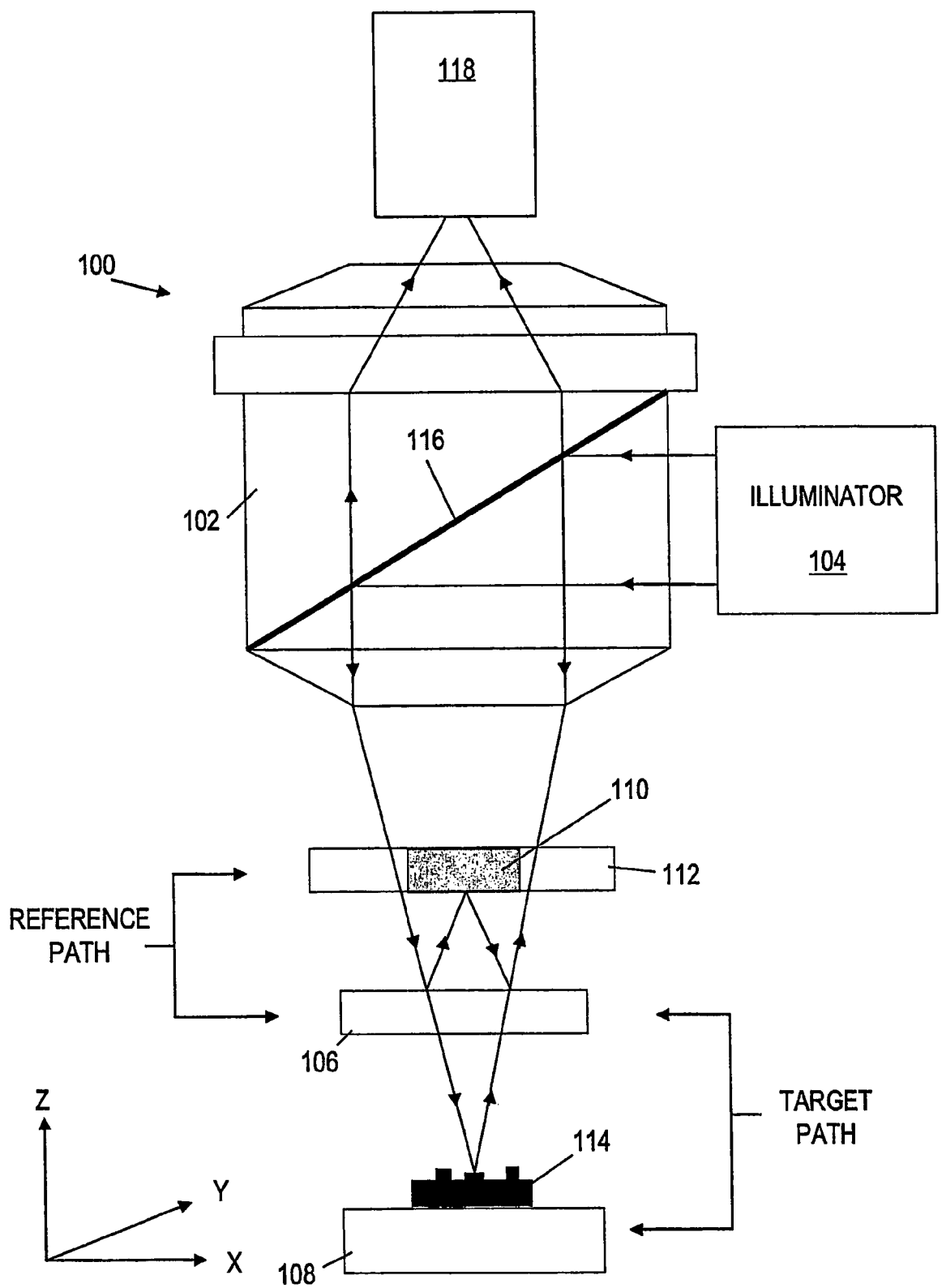
FIG. 1 illustrates a diagram of exemplary interferometric system in accordance with preferred embodiments of the invention.

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to an optical imaging system that includes a non-destructive optical device and a positioning system that precisely and controllably moves one or both of a target object and the optical device to pre-determined locations. A series of images with overlapping pixel footprints may then be acquired and software may combine the acquired images and restore the combined images to improve the lateral resolution. Merely by way of example, the embodiments described herein are directed to a Vertical Scanning Interferometric (VSI) imaging system with an X-Y positioning system.

In accordance with preferred embodiments, a "non-destructive optical device" may include, but is not limited to, interferometric imaging systems and microscopic systems, that create images on a small scale. The object desired to be imaged by the imaging system may be referred to as the "target object." The non-destructive nature of the optical device allows for a non-contact measurement of target objects, such as living organisms, that may be sensitive to contact and low wavelength electromagnetic radiation. The "obtainable resolution" of the optical device is the maximum sustainable lateral resolution capable of being produced solely by the optical device.

In accordance with the preferred embodiments, the lateral resolution of an imaging system with an optical device may be enhanced by acquiring a series of images. The "base" image is a single image acquired by the imaging system. All images after the first, base image may be referred to as "additional" images. Each additional image may be acquired by the same imaging system, but one or both of the target object and the optical device is moved to a new position different from that of the base image or any of the previous additional images via the positioning system. The new position is predetermined and offset from the base image by a distance smaller than the obtainable resolution of the optical device.

The preferred embodiment utilizes additional images that are offset from the base image by "sub-pixel" distances or sub-pixel plus integer full-pixel distances. A sub-pixel distance is a distance in a direction less than the pixel spacing in that direction. The result of a sub-pixel offset is that the footprint of many or all of the pixels in an additional image may be different from the footprint of the pixels in the base or previous additional images. In accordance with the preferred embodiments, the difference in the pixel footprint distribution yields the additional information that may enhance the lateral resolution.

In contrast, there are possible movements that do not yield additional information. For example, it is possible to move the target positioning system or the optical device to a new position in which all of the pixel footprints exactly overlay the pixel footprints of the base image. For example, in a square grid of pixels, if the target positioning system is moved exactly one pixel spacing along the alignment direction of the pixels and a new image is taken, then each pixel footprint (with the exception of some pixels on the outside edge of the image) is identical to the footprint of the neighboring pixel in the previous image. In this case the new image offers no additional useful information. The same is true with movements by integer multiples of the pixel spacing along either of the alignment direction of the pixels. It may also be true for movements by combinations of integer movements along both alignment directions of the pixels.

The preferred embodiments may utilize any pattern of sub-pixel movements to enhance lateral resolution. Examples of possible patterns are 1) translations of the target object in small equal steps in the directions of pixel alignment, 2) translations of the target object in a finely spaced rectangular grid oriented in the directions of pixel alignment, 3) rotation of the target object in small steps about a point inside or outside the image area, and 4) translations of the target object in a finely spaced triangular grid. The same set of patterns apply to the movement of the optical device associated with the imaging system rather than the movement of the target object. The effectiveness of the enhanced lateral resolution may depend upon the pattern of sub-pixel movements chosen.

In alternative embodiments, random sub-pixel movements may also be used. With random sub-pixel movements, there is no pattern to the relative positions of the base image and additional images. The series of positions may, in general, be different for every attempt to increase resolution. Each random position is pre-determined by the imaging system.

VSI, one type of a non-destructive optical device, is a technique for quantifying the topography of a reflective, solid surface. The information obtained from a VSI may be referred to as an "interferogram." Typically, the interferogram obtained from a VSI scan is rendered into an image in which each pixel value represents the height of a respective part of the target object's surface.

For many tasks, as is true of every optical imaging system, the obtainable lateral resolution associated with a VSI device may be insufficient. In accordance with the preferred embodiments, enhanced lateral resolution may be achieved by taking multiple scans of a target object at sub-pixel offsets from a targeted location.

Referring now to FIG. 1, an exemplary interferometric system 100 is shown. Although any type of interferometer, such Michelson and Linnik, may be used, FIG. 1 illustrates an exemplary Mirau interferometric system 100. The interferometric system 100 comprises a main body 102 with an illuminator 104. In addition, a beam splitter 106, a target object 114, a reference mirror 110, and a reference plate 112, and a position system 108 are included in the interferometer system 100. Other components, such as a camera system 118 and a computer system that stores information generated by the optical device, and other configurations of the components may be similarly used.

The VSI system may directly produce two types of images, a 2-dimensional reflected light image of the target object, and interferograms of the target object's surface. The information stored in the interferograms may be used to generate a third type of image that is a three-dimensional height map of the target object's surface. The three-dimensional height map may be viewed as a three-dimensional surface. Typically, the interferogram is produced by splitting light from the illuminator 104 into two beams by the beam splitter 106. The first beam is incident on a target object 114 and the second beam is incident on the reference mirror 110 that is coupled to the reference plate 112. The first beam travels a distance referred to as the "target path," whereas the second beam travels a distance referred to as the "reference path". The first and second beams reflect off the target object 114 and the reference mirror 110 respectively and combine to produce a single beam. If the target path and the reference path are different lengths, the combination of the two beams produces interference. Since the reference path from the beam splitter 106 to the reference mirror 110 is known, the resulting interference patterns, referred to as interference fringes, may be used to determine the length of the target path, and hence the distance to the target object 114. The lateral resolution of each of the three different image types, the reflected light image, the interferogram(s), and the height map, produced by the VSI system 100 may be enhanced by the disclosed method.

In some embodiments, the target object 114 is placed on the positioning system 108 that allows controlled movements with nanometer-precision. These movements are used to position the target object 114 to the sub-pixel location, as previously discussed. In other embodiments, the positioning system is integrated into the objective side of the optical device and the positioning system moves the objective (or lense) to the desired sub-pixel locations.

Typically, any positioning system coupled with an optical device has been used for positioning the target object under the optical device so that the desired part of the target object can be observed in the correct position. This type of positioning may be achieved by using X-Y stage devices, tip-tilt devices, rotation devices, or combinations of them. However, this type of positioning occurs at a larger scale (i.e., the micrometer ($10^{-6}$) to millimeter ($10^{-3}$)) than the sub-pixel movements carried out by the positioning system 108.

In some embodiments, a combination of a nano-positioning device with a micro- to millimeter precision positioning device is used. However, the latter device may have a tolerance, referred to as "play," of more than 1 micrometer. The micro-precision device preferably is locked into position either mechanically, electro-mechanically, or by a combination of mechanical and electro-mechanical means and coupled with a nano-positioning device to achieve the sub-pixel movements.

After a series of base and additional images have been obtained from the imaging system, the series of images may be "combined" into a single, combined image with smaller pixel spacing than that of the base image or any of the additional images. The combining of images can be facilitated if the images are acquired in a pattern that is compatible with the base image pixel spacing.

In some embodiments, image processing techniques may be used prior to image combination. For example, noise may be reduced in each image in the series. The noise reduction may be accomplished using filters in which the desired filtering parameters are based on the nature of the noise present in the images. Random noise may also be reduced by acquiring multiple images without offset. These multiple images may be summed and divided by the number of images to create a single image with higher signal with respect to noise ratio. The resulting image can be used instead of a single image in the series of offset images.

For combination to be effective and yield resolution enhancement, each of the images in the series to be combined also may "balanced." Balance refers to the relative levels of a property (e.g., contrast, illumination) associated with images. A relatively simple example of unbalanced images would be two images acquired with different levels of illumination. One image may be systematically brighter than the other image. If combined in previously mentioned way for enhancing lateral resolution, the resulting combined image would have a checkerboard appearance caused by the addition of short period noise. The noise may tend to swamp the subtle variations in pixel value that are exploited to achieve the enhanced lateral resolution. Each additional image may be processed by comparison to the base image to balance the images. For example, the base image is interpolated to predict the values at the offset pixel locations in an additional image. The difference between the interpolated base image and the additional image is filtered to remove the short period variations and leave the long period variations. The filtered difference image is then added to the additional image. The parameters associated with the balancing and filtering may be selected based upon the characteristics (e.g., size, type of noise) of the images.

If a series of images is acquired on a regular grid of offsets from the base image, and if the grid spacing is set to be the base image pixel spacing divided by an integer, then the combination of the base and the additional images may be simplified. For example, a complete series of base image plus additional images may consist four images. The position of the base image is, by definition, given by the vector (0, 0). The first number in this vector is the offset in units of the pixel spacing in one orthogonal direction of alignment of the pixels. This direction may hereafter be referred to as the X-axis. The second number in this vector is the offset in units of the pixel spacing in the other direction of pixel alignment. This direction may hereafter be referred to as the Y-axis. The three additional images may be obtained with the target object positioned at (0.5, 0), (0, 0.5), and (0.5, 0.5) relative to the base image (0, 0). The four images may be combined by taking alternate pixels from each image. Each group of four neighboring pixels in the combined image consists of one pixel from each of the four images in the series. In the resulting combined image, the pixel spacing in each direction is now half that of the base image. The total area of the surface of the target covered by the combined image is essentially the same as that of the base image. Thus, the lateral resolution may be enhance by a factor of two. The lateral resolution may be enhanced by any factor desired by obtaining more additional images at closer offset locations.

If the relative positions of the series of acquired images do not have a pattern that relates to the pixel distribution in the image, the process of combining the images may be more difficult. The principal objective of the "combining" step is to fill in additional pixels between the pixels in the base image. Ideally, the additional pixels should fall on a regular grid within the base image pixels. If the pattern of positions is chosen carefully, as described above, the pixels of the additional images may fall exactly on a regular grid within the base image pixels. On the other hand, if the pixels in the additional images have a different pattern or are random, having no pattern, then they may not fall exactly on a regular grid. In this case, interpolation will be required to estimate the value of a pixel at a desired location from the values of nearby pixels selected from the base image and series of additional images. The number of pixels that can reasonably be added between the pixels of the base image is a function of how many additional images are acquired and how evenly they are positioned. The number of additional images required is roughly related to the square of the desired factor resolution improvement.

Although the pixels in the combined image are spaced more closely than in the base image or the additional images and the image may have a smoother appearance than that of the base image, the true lateral resolution may not been increased be the combination process. If the footprint of a pixel in the base image covered an area of the target object's surface without overlapping the footprint of any other pixel, then the footprint of each pixel in the combined image will cover the area four, now smaller, pixels. In this case, lateral resolution does not correlate directly with pixel spacing. However, there is inherently more information in the combined image than in the base image. The combined image may be treated as an image that has the full lateral resolution of the closer pixel spacing of the combined image (i.e., without the pixel footprint overlap) that has been blurred. A type of blurring occurs when each pixel in an image is the average of the surface property in a footprint larger than the pixel itself. So, the combined image is a blurred version of an image with enhanced lateral resolution.

Removal of blurring (i.e., "deblurring") in an image is commonly done using a two dimensional deconvolution. Deconvolution is the inverse of a convolution. Blurring is often modeled as the convolution of an image with an operator that describes how the footprint of the neighboring pixels overlap. The operator is known as a "point spread function." Typically, a method of two-dimensional deconvolution may reduce or remove the blurring in the combined image. There are a large number of standard numerical techniques for performing two-dimensional deconvolution. A common technique is Weiner Deconvolution. The use of the Weiner Deconvolution requires that one knows the point spread function of the blurring. Determining the appropriate point spread function for a given imaging system requires knowledge of the system. There are so-called "blind deconvolution" methods that extract an estimate of the point spread function directly from the blurred image and these can also be used on the combined image. Because of the broad applicability of image restoration using deconvolution methods, the range and power of the available numerical tools is expanding continuously and any method may be used to deblur the combined image to produce an image with the desired enhanced lateral resolution.

Numerous variations and modifications will become apparent to those skilled in the art once the above disclosure is fully appreciated. It is intended that the following claims be interpreted to embrace all such variations and modifications.

What is claimed is:

1. An imaging system, comprising:
    a non-destructive optical device that obtains information concerning a target object; and
    an X-Y positioning system adapted to position one or both of the target object and the optical device to multiple pre-determined locations with movements smaller than the obtainable lateral resolution of the optical device.

2. The system of claim 1 wherein the non-destructive optical device comprises an interferometer.

3. The system of claim 1 wherein the non-destructive optical device comprises a microscope.

4. The system of claim 1 wherein the positioning system comprises a positioning system with nanometer-precision or better.

5. The system of claim 1 wherein the positioning system positions with movements selected from the group consisting of rotation in the horizontal plane, rotation in the vertical plane, tilting in the horizontal plane, tilting in the vertical plane, and a combination thereof.

6. The system of claim 1 wherein the predetermined locations are determined by rotating the target object.

7. The system of claim 1 wherein the pre-determined locations are determined by selecting random sub-pixel locations.

8. The system of claim 1 further comprising a computer system coupled to the optical device for storing the information obtained from the non-destructive optical device.

9. The system of claim 1 wherein the positioning system comprises a first positioning system with a precision an order of magnitude better than a second position positioning system that is coupled to the first positioning system.

10. The system of claim 9 wherein the second positioning system is locked into place with a locking device selected form the group consisting of a mechanical lock, a electrical lock, or a combination of thereof.

11. A method for producing high-resolution images of a target object with a non-destructive optical device, the method comprising:
    positioning one or both of the target object and the non-destructive optical device to pre-determined offset locations more closely spaced than the obtainable resolution of the optical device;
    producing a plurality of images from information generated by the optical device at the offset locations; and
    combining the plurality of images to produce a single combined image.

12. The method of claim 11 further comprising stacking the images produced from the offset locations to reduce noise associated with the images.

13. The method of claim 11 further comprising deblurring the single combined image using a mathematical operation selected from the group consisting of inverse filters, deconvolution filters, direct inverse filters, Wiener filters, regularized deconvolution filters, blind deconvolution filters, wavelet-based inverse filters, and combinations thereof.

14. A non-destructive optical imaging system, comprising:
    a means for obtaining information describing a target object with electromagnetic radiation;
    a means for positioning the target object and/or imaging system to pre-determined offset locations smaller than the obtainable resolution of the information; and
    a means for generating images from the information; and
    a means for combing the generated images into a single combined image.

15. The non-destructive optical imaging system of claim 14 further comprising a means for deblurring the single combined image.

16. A method for producing images of an optical device, the method comprising:
    positioning one or both of the target object and the optical device to pre-determined offset locations more closely spaced than the obtainable resolution of the optical device;
    producing a plurality of images at each offset location from information generated by the optical device;
    stacking the plurality of images produced at each offset location to remove noise; and
    combining the stacked images into a single combined image with a pixel spacing less than the pixel spacing of the pixel spacing of the plurality of images produced at each offset location.

17. The method of claim 16 further comprising deblurring the single combined image using a mathematical operation selected from the group consisting of inverse filters, deconvolution filters, direct inverse filters, Wiener filters, regularized deconvolution filters, blind deconvolution filters, wavelet-based inverse filters, and combinations thereof.

18. The method of claim 16 wherein the optical device is selected from the group consisting of a microscope and an interferometer.

* * * * *

UNITED STATES PATENT AND TRADEMARK OFFICE
CERTIFICATE OF CORRECTION

| | | |
|---|---|---|
| PATENT NO. | : 7,324,215 B2 | Page 1 of 1 |
| APPLICATION NO. | : 10/528720 | |
| DATED | : January 29, 2008 | |
| INVENTOR(S) | : Andreas Luttge et al. | |

It is certified that error appears in the above-identified patent and that said Letters Patent is hereby corrected as shown below:

In column 1, line 14, add

--STATEMENT REGARDING FEDERALLY SPONSORED RESEARCH OR DEVELOPMENT

This invention was made with government support under Subcontract Number 1230844 awarded by the Jet Propulsion Laboratory, operating under prime Contract Number NAS7-1407 awarded by NASA. The government has certain rights in the invention.--

Signed and Sealed this
Twentieth Day of March, 2012

David J. Kappos
*Director of the United States Patent and Trademark Office*

UNITED STATES PATENT AND TRADEMARK OFFICE
CERTIFICATE OF CORRECTION

PATENT NO. : 7,324,215 B2
APPLICATION NO. : 10/528720
DATED : January 29, 2008
INVENTOR(S) : Andreas Luttge et al.

Page 1 of 1

It is certified that error appears in the above-identified patent and that said Letters Patent is hereby corrected as shown below:

In column 1, line 14, add

--STATEMENT REGARDING FEDERALLY SPONSORED RESEARCH OR DEVELOPMENT

This invention was made with government support under Subcontract Number 1230844 awarded by the Jet Propulsion Laboratory, operating under prime Contract Number NAS7-1407 awarded by the National Aeronautics and Space Administration and Grant Number N66001-02-C-8050 awarded by the Department of Navy. The government has certain rights in the invention.--

This certificate supersedes the Certificate of Correction issued March 20, 2012.

Signed and Sealed this
First Day of May, 2012

David J. Kappos
*Director of the United States Patent and Trademark Office*